US012720389B2

(12) United States Patent
Salmela et al.

(10) Patent No.: US 12,720,389 B2
(45) Date of Patent: Aug. 25, 2026

(54) SLICE CONTINUITY IN HANDOVER

(71) Applicant: Telefonaktiebolaget LM Ericsson (publ), Stockholm (SE)

(72) Inventors: Patrik Salmela, Espoo (FI); Markus Hanhisalo, Espoo (FI); Juha Kujanen, Keuruu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 18/280,152

(22) PCT Filed: Feb. 3, 2022

(86) PCT No.: PCT/IB2022/050959
§ 371 (c)(1),
(2) Date: Sep. 1, 2023

(87) PCT Pub. No.: WO2022/185131
PCT Pub. Date: Sep. 9, 2022

(65) Prior Publication Data

US 2024/0155452 A1 May 9, 2024

Related U.S. Application Data

(60) Provisional application No. 63/155,139, filed on Mar. 1, 2021.

(51) Int. Cl.
*H04W 36/08* (2009.01)
*H04W 36/00* (2009.01)
*H04W 48/18* (2009.01)

(52) U.S. Cl.
CPC .......... *H04W 36/08* (2013.01); *H04W 36/13* (2023.05); *H04W 48/18* (2013.01)

(58) Field of Classification Search
CPC ..... H04W 36/08; H04W 36/13; H04W 48/18; H04W 76/18; H04W 36/083; H04W 36/085; H04W 36/087
See application file for complete search history.

(56) References Cited

U.S. PATENT DOCUMENTS

2020/0137639 A1* 4/2020 Yuan .................... H04W 76/30
2020/0178196 A1* 6/2020 Wang ................. H04W 60/005
(Continued)

FOREIGN PATENT DOCUMENTS

WO 2020165665 A1 8/2020
WO 2021021423 A1 2/2021
WO WO-2021021580 A1 * 2/2021 ........... H04W 36/13

OTHER PUBLICATIONS

63061619,Abstract,Aug. 5, 2020 (Year: 2020).*
(Continued)

*Primary Examiner* — Ji-Hae Yea
(74) *Attorney, Agent, or Firm* — Sonoda & Kobayashi Intellectual Property Law; Sarvajit S. Patil

(57) ABSTRACT

Systems and methods for network slice continuity in handover of a communication network are provided. In some embodiments, a User Equipment (UE) is configured to receive, from a network node on a first cell, a first message comprising an indication of at least one cell that supports a particular network slice and engage in a handover operation based on the indication comprised in the received first message. In some embodiments, a network node is configured to sending, to a UE on a first cell, a first message comprising an identification of at least one cell that supports a particular network slice.

26 Claims, 7 Drawing Sheets

(56) References Cited

U.S. PATENT DOCUMENTS

| | | | | |
|---|---|---|---|---|
| 2020/0351729 | A1* | 11/2020 | Rastegardoost | H04W 36/0072 |
| 2021/0297910 | A1* | 9/2021 | Maguire | H04W 48/20 |
| 2023/0300739 | A1* | 9/2023 | Nuggehalli | H04W 48/20 455/434 |

OTHER PUBLICATIONS

63061619,Claims,Aug. 5, 2020 (Year: 2020).*

63061619,Drawings-only_black_and_white_line_drawings,Aug. 5, 2020 (Year: 2020).*

63061619,Specification,Aug. 5, 2020 (Year: 2020).*

3GPP, "3rd Generation Partnership Project; Technical Specification Group RAN; NR; Study on enhancement of Radio Access Network (RAN) slicing (Release 17)", TR 38.832 V0.4.0, Jan. 2021.

3Gpp, "Technical Specification; 3rd Generation Partnership Project; Technical Specification Group Services and System Aspects; Procedures for the 5G System (5GS); Stage 2 (Release 16)", TS 23.502 V16.7.1, Jan. 2021.

CMCC, "Service continuity for slicing", 3GPP TSG-RAN WG3 Meeting #109 Electronic, R3-205440, Online, Aug. 17-28, 2020.

* cited by examiner

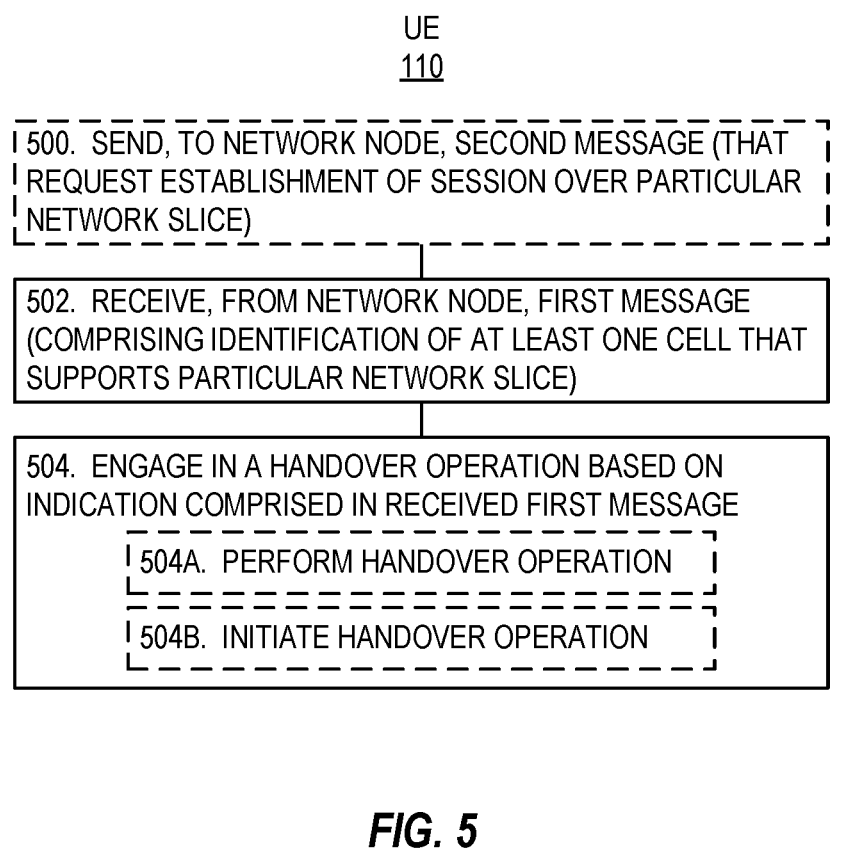

UE
110

500. SEND, TO NETWORK NODE, SECOND MESSAGE (THAT REQUEST ESTABLISHMENT OF SESSION OVER PARTICULAR NETWORK SLICE)

502. RECEIVE, FROM NETWORK NODE, FIRST MESSAGE (COMPRISING IDENTIFICATION OF AT LEAST ONE CELL THAT SUPPORTS PARTICULAR NETWORK SLICE)

504. ENGAGE IN A HANDOVER OPERATION BASED ON INDICATION COMPRISED IN RECEIVED FIRST MESSAGE

504A. PERFORM HANDOVER OPERATION

504B. INITIATE HANDOVER OPERATION

*FIG. 5*

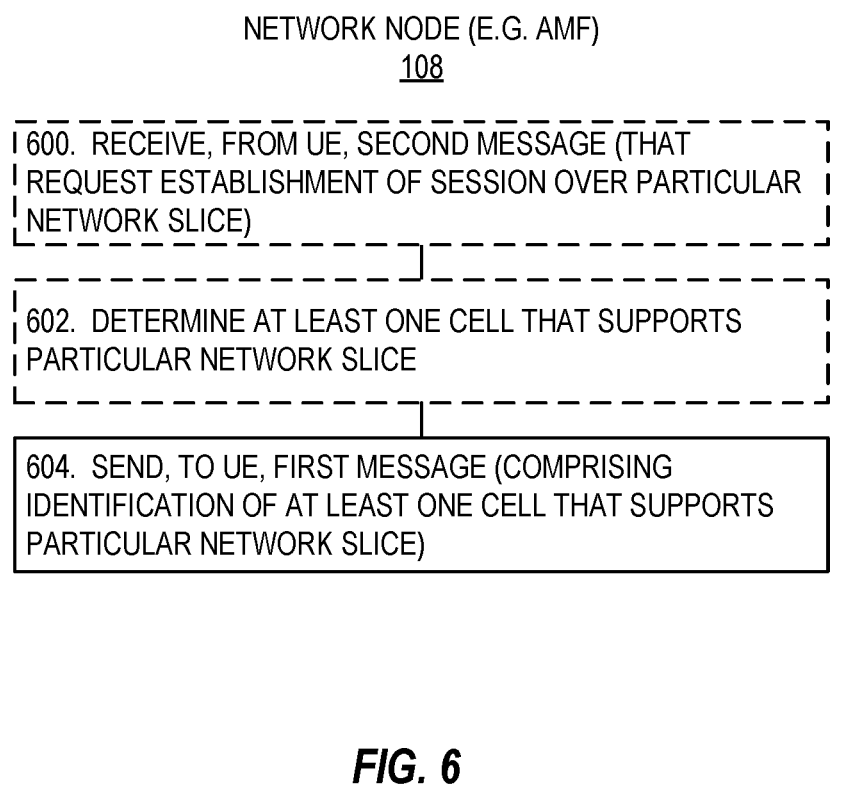

NETWORK NODE (E.G. AMF)
108

600. RECEIVE, FROM UE, SECOND MESSAGE (THAT REQUEST ESTABLISHMENT OF SESSION OVER PARTICULAR NETWORK SLICE)

602. DETERMINE AT LEAST ONE CELL THAT SUPPORTS PARTICULAR NETWORK SLICE

604. SEND, TO UE, FIRST MESSAGE (COMPRISING IDENTIFICATION OF AT LEAST ONE CELL THAT SUPPORTS PARTICULAR NETWORK SLICE)

FIG. 6

SLICE CONTINUITY IN HANDOVER

RELATED APPLICATIONS

This application is a national stage application of International patent application number PCT/IB2022/050959, filed Feb. 3, 2022, which claims the benefit of provisional patent application No. 63/155,139, filed Mar. 1, 2021, the disclosures of which are hereby incorporated in their entirety by reference.

TECHNICAL FIELD

The present disclosure is directed to network slice continuity in handover of a communication network such as a Fifth Generation (5G) network.

BACKGROUND

Network slicing in Fifth Generation (5G) makes it possible to create specific slices of a 5G network for specific use cases and service requirements. In network slicing, a User Equipment (UE), or the network, typically identifies a network slice ("slice", for short) using a slice identifier (e.g., Single-Network Slice Selection Assistance Information (S-NSSAI)). The UE can request to use a specific slice, for instance, by providing or indicating the slice identifier, S-NSSAI, in 5G registration or Protocol Data Unit (PDU) session establishment.

In the context of Third Generation Partnership Project (3GPP) TR 38.832 V0.4.0 (2021 Jan. 15), researchers are considering a situation where a UE performs a handover from a source New Radio Base Station (gNB) to a target gNB, seeking to define actions for different scenarios, such as one in which a slice is not available in the target gNB. One proposal of 3GPP TR 38.832 V0.4.0 (2021 Jan. 15) is as follows: "Solution 3: Slice related cell selection info (e.g., Cell reselection priority per slice), the slice info of serving cell and neighboring cells is provided in the system information or RRCRelease message."

SUMMARY

Systems and methods for network slice continuity in handover of a communication network such as a Fifth Generation (5G) network are provided. In one embodiment, a method performed by a User Equipment (UE) comprises receiving, from a network node on a first cell, a first message comprising an indication of at least one cell that supports a particular network slice and engaging in a handover operation based on the indication comprised in the received first message. By this way, the UE can make an educated choice with respect to which cell it should select when using a slice and doing a handover, thereby maintaining service continuity.

In one embodiment, the feature of engaging in the handover operation comprises performing the handover operation.

In one embodiment, the feature of engaging in the handover operation comprises initiating the handover operation by sending a handover request to a target cell from among the at least one cell.

In one embodiment, the first message is a Protocol Data Unit (PDU) session establishment accept message.

In one embodiment, the first message comprises a PDU modification command comprising the indication of that at least one cell that supports the particular network slice.

In one embodiment, the method further comprises sending, to the network node, a second message that requests establishment of a session over the particular network slice, wherein receiving the first message comprises receiving the first message in response to the sending second message.

In one embodiment, the second message is a PDU session establishment request, and the first message is a PDU session establishment accept message.

In one embodiment, the network node is an Access and Mobility Function (AMF).

In one embodiment, the particular network slice is identified by a Single-Network Slice Selection Assistance Information (S-NSSAI) and is a network slice that is either selected by the UE or selected the network node.

In one embodiment, the method further comprises sending, to the network node, a measurement report only about the at least one cell.

Corresponding embodiments of a UE are also disclosed.

In one embodiment, a UE is adapted to receive, from a network node on a first cell, a first message comprising an indication of at least one cell that supports a particular network slice and engage in a handover operation based on the indication comprised in the received first message.

In one embodiment, a UE comprises one or more transmitters, one or more receivers, and processing circuitry associated with the one or more transmitters and the one or more receivers, the processing circuitry configured to cause the UE to receive, from a network node on a first cell, a first message comprising an indication of at least one cell that supports a particular network slice and engage in a handover operation based on the indication comprised in the received first message.

In one embodiment, a method performed by a network node, comprises sending, to a UE on a first cell, a first message comprising an identification of at least one cell that supports a particular network slice.

In one embodiment, the method further comprises determining the at least one cell that supports the particular network slice based on one or more of factors related to the UE or one or more cells.

In one embodiment, the factors comprise one or more of: (a) a cell identifier (ID), associated with the UE, (b) a S-NSSAI of the particular network slice, (c) cells that support the particular network slice, or (d) load associated with the cells that support the particular network slice.

In one embodiment, the first message comprises a PDU modification command comprising the indication of that at least one cell that supports the particular network slice.

In one embodiment, the method further comprises receiving, from the UE, a second message that requests establishment of a session over the particular network slice. The feature of sending the first message to the UE comprises sending the first message to the UE in response to the receiving the second message.

In one embodiment, the second message is a PDU session establishment request, and the first message is a PDU session establishment accept message.

In one embodiment, the network node is an AMF.

In one embodiment, the particular network slice is identified by a S-NSSAI and is a network slice that is either selected by the UE or selected the network node.

In one embodiment, the method further comprises receiving, from the UE, a measurement report only about the at least one cell.

Corresponding embodiments of a network node are also disclosed.

In one embodiment, a network node is adapted to send, to a UE on a first cell, a first message comprising an identification of at least one cell that supports a particular network slice.

In one embodiment, a network node comprising processing circuitry configured to cause the network node to send, to a UE on a first cell, a first message comprising an identification of at least one cell that supports a particular network slice.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5 shows a flow diagram for steps performed by the UE in accordance with some embodiments.

FIG. 6 shows a flow diagram for steps performed by a network node (e.g., the AMF) in accordance with some embodiments.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
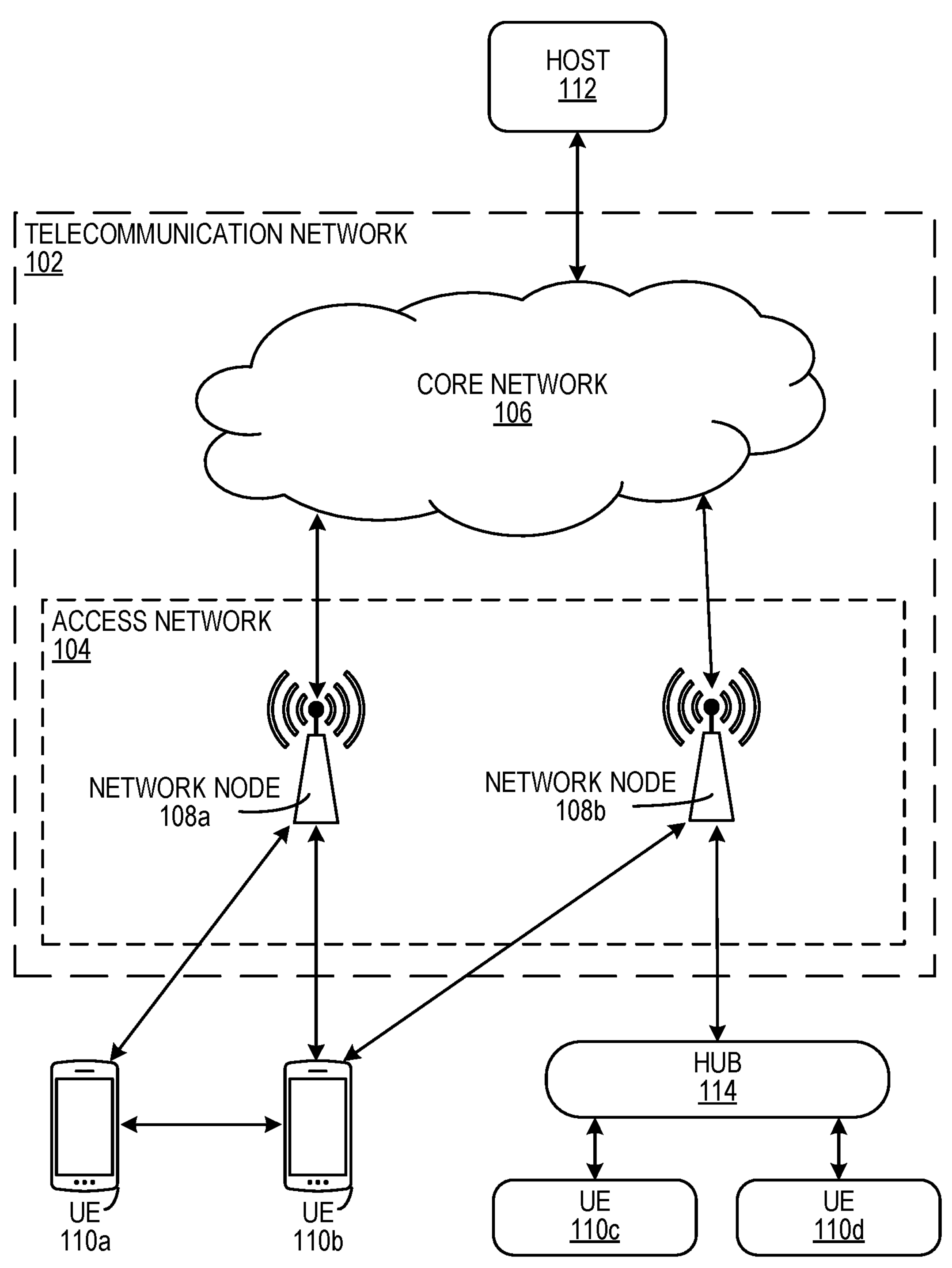
FIG. 1 illustrates an example of a communication system in accordance with some embodiments.

FIG. 1 shows an example of a communication system in accordance with some embodiments. Although the subject matter described herein may be implemented in any appropriate type of system using any suitable components, the embodiments disclosed herein are described in relation to various network elements, such as those shown in FIG. 1.

In the present example, the communication system includes a telecommunication network 102 that includes an access network 104, such as a radio access network (RAN), and a core network 106. The access network 104 includes one or more access network nodes, such as network nodes 108*a* and 108*b*, or any other similar 3rd Generation Partnership Project (3GPP) access node or non-3GPP access point, facilitating direct or indirect connection of different communication devices, such as User Equipment (UEs) 110*a*, 110*b*, 110*c*, and 110*d*, and a hub 114 to the core network 106 over one or more wireless connections. The network nodes 108*a* and 108*b* are arranged, capable, configured, and/or operable to communicate directly or indirectly with UEs and/or with other network nodes 108 or equipment in the telecommunication network 102 to enable and/or provide network access, such as wireless network access, to the UEs and/or to perform other functions (e.g., administration) in the telecommunication network 102. Examples of the network nodes 108 are Access and Mobility Management Function (AMF) and Session Management Function (SMF).

In the present example, the core network 106 connects the access network 104 to one or more hosts (e.g., server hosts), such as host 112. The core network 106 may be connected to the access network 104 via one or more interfaces between the various core network nodes (not shown) and the network nodes 108 and may be connected to the host 112 directly or indirectly via one or more intermediary networks or devices.

The UEs 110*a*, 110*b*, 110*c*, and 110*d* may be any of a wide variety of communication devices, including wireless devices capable of communicating wirelessly with network nodes 108*a* and 108*b*, and possibly with other communication devices. Communicating wirelessly involves transmitting and/or receiving wireless signals using electromagnetic waves, radio waves, infrared waves, and/or other types of signals suitable for conveying information without a material connection. Accordingly, the UEs 110*a*, 110*b*, 110*c*, and 110*d* are arranged, capable, configured, and/or operable to communicate with the network nodes 108*a* and 108*b*, and/or other UEs.

As a whole, the communication system of FIG. 1 enables connectivity between the UEs (connected to the network nodes 108) and the hosts 112. In that sense, the communication system may be configured to operate according to specific standards or other types of predefined rules or procedures. Thus, particular embodiments of the communication system may implement communication standards, such as Global System for Mobile Communications (GSM), Universal Mobile Telecommunications System (UMTS), Long Term Evolution (LTE), and/or other suitable 2G, 3G, 4G, 5G standards or any applicable future generation standard, like a future 6G standard; wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave and/or ZigBee standards.

In different embodiments, the communication system may include any number of wired or wireless networks, network nodes, base stations, controllers, UEs, hubs, relay stations, and/or any other components or systems that may facilitate or participate in the communication of data and/or signals whether via wired or wireless connections. The communication system may include and/or interface with any type of communication, telecommunication, data, cellular, and/or radio network or other similar type of system.

In some examples, the telecommunication network 102 is a cellular network that implements (3GPP) standardized functionality. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UE devices, while providing Enhanced Mobile Broadband (eMBB) services to other UEs, and/or Massive Machine Type Communication (mMTC) services to yet further UEs.

The UE 110 may be configured to transmit and/or receive information without direct human interaction. For instance, the UE 110 may be designed to transmit information to the access network 104 on a predetermined schedule, when triggered by an internal or external event, or in response to requests from the access network 104. Additionally, a communication device may be configured for operating in single- or multi-RAT or multi-standard mode. For example, communication device may operate with any one or combination of Wi-Fi, NR (New Radio) and LTE, i.e. being configured for multi-radio dual connectivity (MR-DC), such as E-UTRAN New Radio-Dual Connectivity (EN-DC). The communication devices/UEs 110*a*, 110*b*, 110*c*, and/or 110*d* may include one or more sensors, actuators, and/or a screen. Other examples of a UE 110 include virtual reality (VR) or augmented reality (AR) headset, a Machine-2-Machine (M2M) device, an internet of things (IoT) device, an internet of everything (IoE) device, or any other type of device which is capable of accessing a communication network.

In the present example, the hub 114 is a communication device that communicates with the access network 104 using a standard protocol, for example a wireless standard such as one provided by 3GPP, to facilitate indirect communication between one or more UEs (e.g., UE 110*c* and 110*d*) and one or more network nodes (e.g., the network node 108*b*). Hub 114 may include memory to store data (e.g., video, audio, images, buffer, sensor data, file share) that is collected from, or is to be provided to, the UEs 110*c* and 110*d*. Hub 114 may include a processor, operating system, and server functionality. Hub 114 may also include routing capabilities, firewall capabilities, a virtual private network (VPN) server or VPN client.

The hub 114 may be, for example, a controller, router, content source and analytics, and any of the communication devices described regarding UEs, such as a wireless device. As an example, the hub 114 may be a broadband router enabling direct or indirect access to the core network 106 for the UEs 110*c* and 110*d*. As another example, the hub 114 may be a controller that sends commands or instructions to one or more actuators in the UEs 110*c* and 110*d*. The commands or instructions may be received from a UE 110, from the network node 108*b*, or by executable code, script or process instructions in the hub 114. As another example, the hub 114 may be a data collector, and act as a temporary storage for data from a UE 110 and, in some embodiments, may perform analysis or other processing of the data. As another example, the hub 114 may be a content source. For example, when the UE 110*c* or 110*d* is a VR headset, display, loudspeaker or other media delivery device, the hub 114 may retrieve VR assets, video, audio, or other media via the network node 108*b* which the hub 114 then provides to the UE 110 either directly, after some local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 108*b*. The hub 114 may also allow for a different communication scheme and/or schedule between the hub 114 and the UE (e.g., 110*c*) and between the hub 114 and the core network 106. In other embodiments, the hub 114 is connected to the core network 106 and/or one or more of the UEs 110*c* and 110*d* via a wired connection. Moreover, the hub 114 may be configured to connect to a M2M service provider over access network 104 and/or to another communication device over a direct connection. In some scenarios, UEs 110*c* and 110*d* may establish a wireless connection with network nodes 108*a* or 108*b* while still connected via the hub 114 via a wired or wireless connection. The hub 114 may be a dedicated hub—that is, a hub whose primary function is to route communications to/from the UEs 110*c* and 110*d* from/to the network node 108*b*—or a non-dedicated hub—that is, a device which is capable of operating to route communications between the UEs 110*c* and 110*d* and network node 108*b*, but which is additionally capable of operating as a communication start and/or end point for certain data channels.

In a current solution, the target gNB, if it does not support the slice or cannot add a new UE 110 to the slice, rejects the connection and thus there is service interruption. The network sends an RRCRelease message when it requires the UE 110 to move away from the connected state, i.e., to be not connected or idle. Such interruptions, however, are not welcome when service continuity is a high priority.

When the UE 110 makes a handover from one cell to another, it is the network that instructs the UE 110 on which cell to move to. The UE 110 reports measurements for the cells it can hear and reports this back to the network. Based on this information the network can select which cell the UE 110 should move to.

Current approaches exhibit certain drawbacks, as recognized by the inventors. For instance, broadcasting slice information, such as Single-Network Slice Selection Assistance Information (S-NSSAI), may have privacy or other security implications. An attacker could e.g., see where a particular slice is provided and target distributed denial-of-service (DDoS) attacks to those cells broadcasting and thus supporting the particular slice/S-NSSAI. Another issue is that private networks (Non-Public Network (NPN)) can be provided via slicing, with a slice representing a private network. Broadcasting that a specific private network is reachable through a specific cell again brings unwanted attention and reveals information about the private network.

Certain aspects of the present disclosure may provide solutions to these or other challenges. For example, in some embodiments, a network, once it recognizes and accepts a UE 110 to use a particular network slice, can indicate to the UE 110 the neighboring cells that support the slice. It can provide this indication, for instance, via dedicated signaling to the UE 110 rather than by broadcasting system information. Moreover, the network can provide this information by a secured channel to provide confidentiality and/or integrity, for instance. This way the UE 110 has the information, but it is not leaked to unauthorized entities via broadcast. The UE 110 can use the information to select a target cell that is known to serve the same slice and thus have service continuity even when doing handover. In other words, the UE 110 can select the target cell based on the received information, providing network slice service continuity while preserving privacy during handover.

Certain embodiments may provide one or more technical advantages. For instance, a UE 110 can make an educated choice with respect to which cell it should select when using a slice and doing a handover, thereby maintaining service continuity.

Some of the embodiments contemplated herein will now be described more fully with reference to the accompanying drawings. Other embodiments, however, are contained within the scope of the subject matter disclosed herein; the disclosed subject matter should not be construed as limited to only the embodiments set forth herein; rather, these embodiments are provided by way of example to convey the scope of the subject matter to those skilled in the art.

In one embodiment, when the UE 110 sends a protocol data unit (PDU) session establishment request, it includes the S-NSSAI for the slice it wants to use. The Access and Mobility Management Function (AMF) 108, in addition, learns the cell ID of a cell through which the UE 110 is connected. If S-NSSAI is not included, the AMF 108 determines the S-NSSAI.

When the PDU session has been accepted by the network, the AMF 108 sends a Non-Access Stratum (NAS) message containing a PDU Session ID and a 'PDU Session Establishment Accept' message targeted to the UE 110. In this message the AMF 108 could include now also relevant cell IDs of cells that are likely targets when the UE 110 is mobile and that support the selected S-NSSAI (slice).

Figure 2:
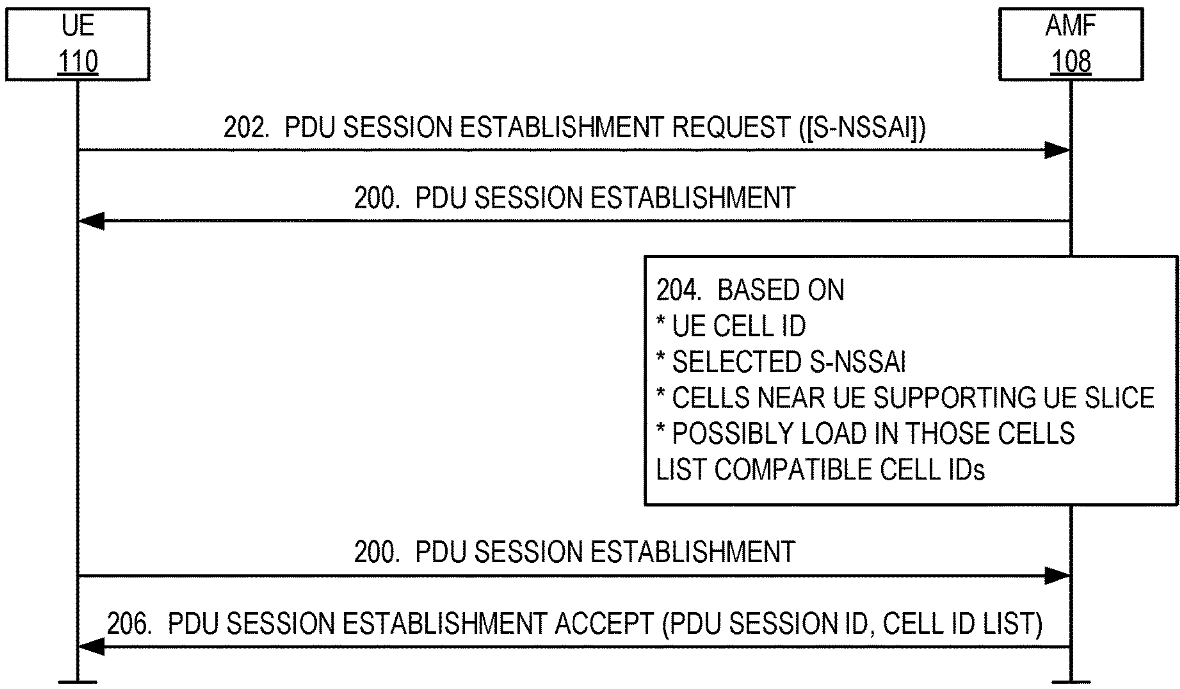
FIG. 2 illustrates a method performed by a User Equipment (UE) and an Access and Mobility Management Function (AMF) in accordance with some embodiments.

FIG. 2 illustrates a method according to certain embodiments. As illustrated in FIG. 2, in step 200, the UE 110 performs PDU session establishment, optionally, indicating requested S-NSSAI in initial request message ('PDU session establishment request' message sent in step 202). During the PDU session establishment, in step 204, the AMF 108 uses the following information to deduce the compatible cells, i.e. (a) cells close to the UE 110 that support the slice selected for the UE/PDU session and (b) cells that optionally have resources available to serve the UE 110 if it were to move to the cells. Finally, in the accept message ('PDU session establishment accept' message sent in step 206), the AMF 108 communicates the list of compatible cell IDs to the UE 110. As shown in the step 204, the AMF 108 selects compatible cell IDs and communicating that list from the AMF 108 to the UE 110 in (e.g.) PDU accept message.

As shown in step 204 of FIG. 2, the network (such as the AMF 108) can deduce the cell IDs to include based on (a) the slice the UE 110 is using, (b) UE's current location (cell ID received in the 'PDU session establishment request' in step 202), (c) cells in the vicinity of the UE 110 that also support the same slice/S-NSSAI, and (d) possibly the load in the slice in those identified cells.

Based on received information (such as IDs) about slice supporting cells, the UE can affect cell selection by performing and reporting measurements only for those cells on the slice specific cell ID list and provide those measurements back to the network. (Of course, if none of those cells is heard by the UE 110, it needs to report some other cell IDs+measurements back to the network, possibly resulting in handover to cell not supporting the slice). This way, the network can only choose between cells serving the specific slice the UE 110 is using. Thus, when the network tells the UE 110 to move to another cell, it will be to one of the cells the UE 110 has reported measurements for, i.e., one of the cells on the slice specific cell ID list. Thereby the UE 110 can continue to use the slice and maintain service without interruption. This is especially relevant for URLLC and other non-best effort type of slices.

The consideration of which cell IDs are suitable for the UE 110 might change over time, either due to the UE 110 being mobile and changing its location, or because load in identified cells change over time. The network can update the list of suitable cell IDs to the UE 110 by signaling a new set of cell IDs, or changes to the already provided set (e.g., adding or removing cell Ids from the set). This could be done using PDU session modification signaling as defined in 3GPP TS 23.502 V16.7.1 (2021 Jan. 13), clause 4.3.3, which is typically used for updating Quality-of-Service (QoS) parameters for a session.

Optionally, the AMF 108, or Session Management Function (SMF) on its own, can trigger the SMF to initiate the PDU session modification. Optionally, the SMF then sends N1 SM to the AMF 108 with information for the UE 110. It might not be necessary to trigger the SMF to send the message to the AMF 108, instead the AMF 108 could act on its own. The AMF 108 optionally creates an N1 SM container which carries a 'PDU Session Modification Command' message, which is sent to the UE 110, as shown in step 302 of FIG. 8. The 'PDU Session Modification Command' message contains the updates to the cell ID list associated with the slice. The 'PDU Session Modification Command' message could also optionally contain the S-NSSAI to which the cell ID list pertains. The UE 110 receives the updates to the slice cell ID list and acknowledges this.

Figure 3:
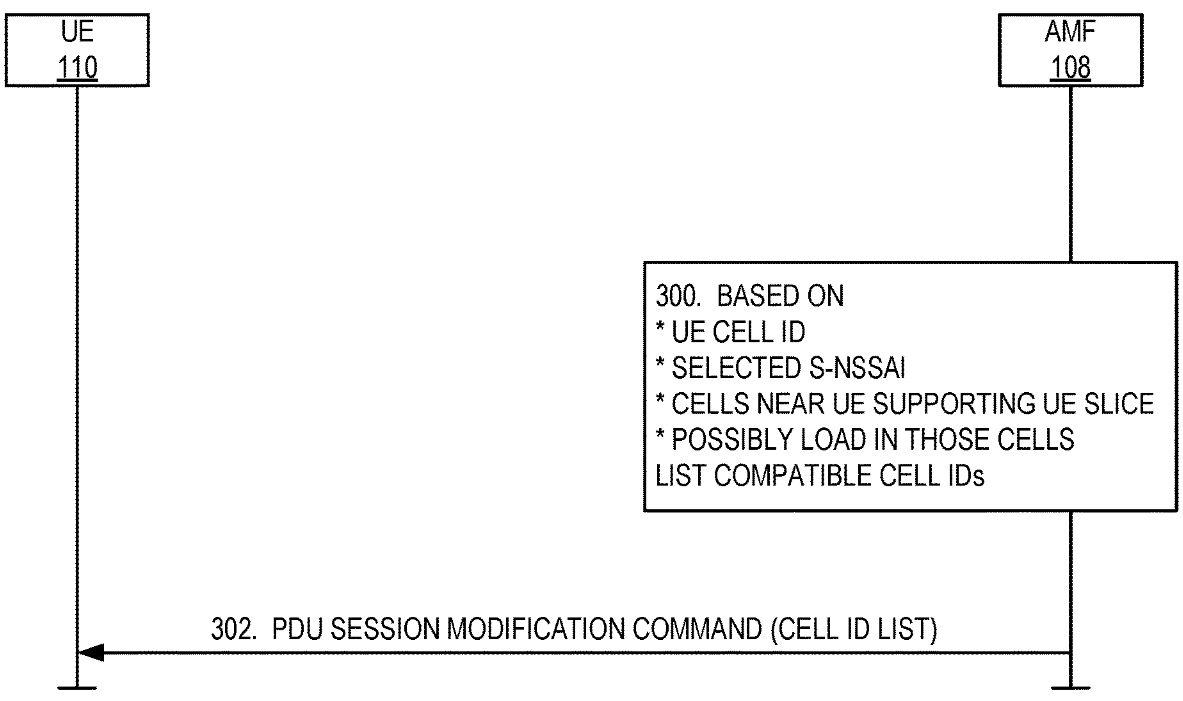
FIG. 3 illustrates a method performed by the AMF in accordance with some embodiments.

FIG. 3 illustrates a method according to certain other embodiments. Referring to FIG. 3, the AMF 108/network, at certain interval, or triggered by an event such as the UE 110 doing a handover, does a re-evaluation of suitable cell IDs for the UE/slice, as shown in step 300. It can use the same input data as for PDU session establishment illustrated in FIG. 2 and the above paragraphs about FIG. 2. If the UE 110 has not been mobile, the only data to consider when doing re-evaluation is the load at the cells serving the slice; if some cell suddenly is overloaded it would be removed from the list, and if some cell suddenly is no longer so loaded it could be added to the list. If load is not used as input parameter, the cell ID list would remain static as long as the UE 110 is attached to the same cell. If triggered by the UE 110 moving to another cell, the cell list evaluation would be done more or less from scratch as the new cell (typically) has at least partly new neighboring cells compared to the previous cell the UE 110 was using.

Updating the cell ID list could be done using some other, possibly new, messaging between the AMF 108 or some other Network Function (NF) communicating through the AMF 108, and the UE 110 as well.

Figure 7:
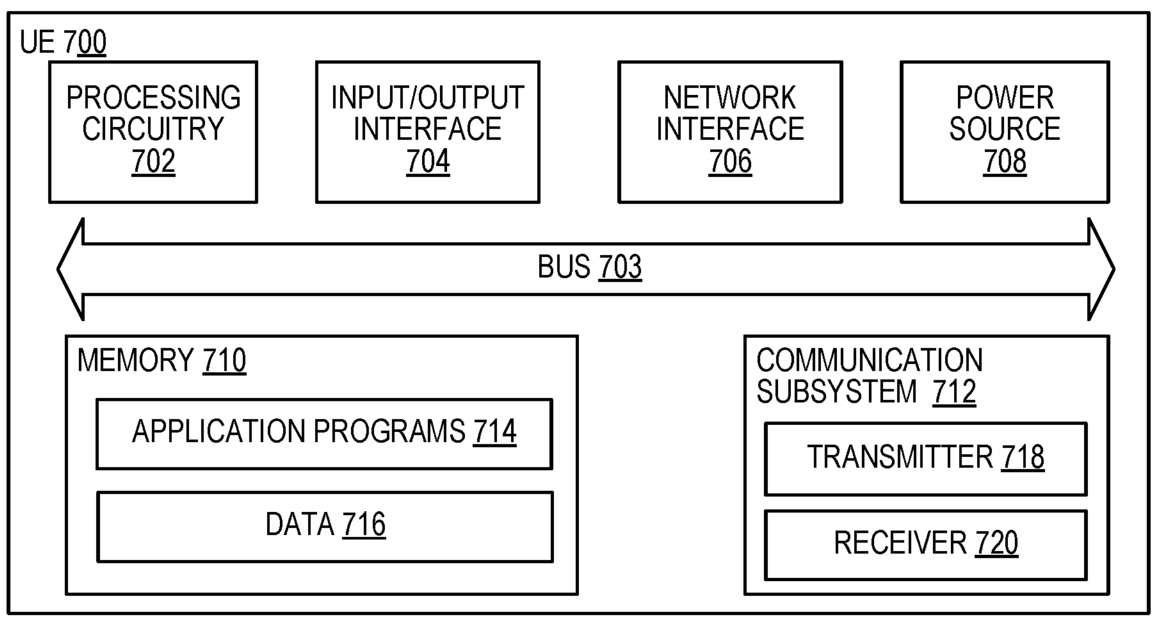
FIG. 7 illustrates a UE in accordance with some embodiments.
Figure 8:
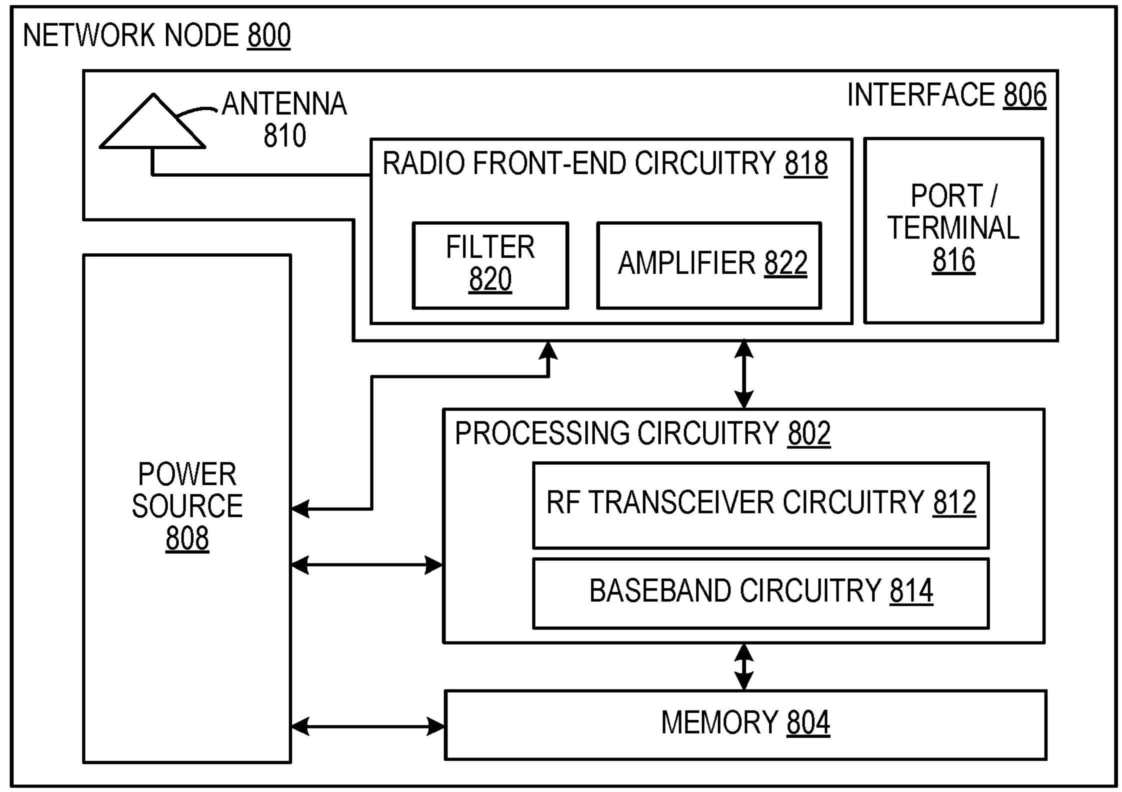
FIG. 8 illustrates a network node in accordance with some embodiments.

The concepts illustrated in FIGS. 7 and 8 could be similarly applied when a UE 110 uses multiple slices simultaneously. In case the UE 110 has multiple slices in use it may get individual cell ID lists for each slice, so the UE 110 would know, for each slice, which cell IDs can be used to maintain slice service, i.e. for each slice, the network would tell the UE 110 which close-by cell IDs support the specific slice (i.e. provide cell ID list), either as described earlier explicitly indicating the slice identity (S-NSSAI) for which the cell ID list is valid together with the cell ID list, or the UE 110 could deduce it from the PDU context to which the signaling containing the cell ID list pertains.

Figure 4:
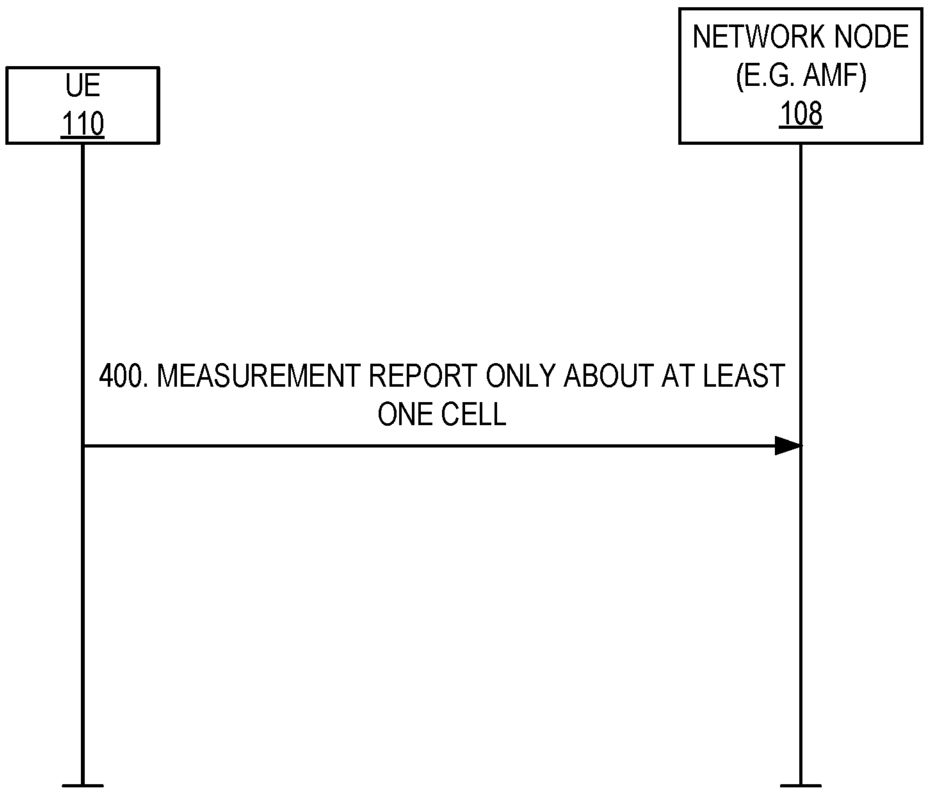
FIG. 4 illustrates that the UE sends a measurement report only about at least one cell.

However, it is possible that if the UE 110 is using slices A, B, C in cell X, no neighboring cell, or only a few neighboring cells, support all 3 slices. Suppose, for instance, that cell Y supports A and B but not C, while cell Z supports only C. In this case, the UE 110 can decide which slices are most important to keep if/when mobile and moving to a new cell and there is not a cell available that supports all slices being used. In the example, if slice C is the most important one the UE 110 could, for example, only report measurement values for neighboring cell Z which it knows will provide slice C services. Thus, the UE 110 is in control and can make a policy or educated decision on which slices have the highest priority and should be maintained if there is a need to move to a cell where all current slices are not supported. Based on this educated/policy decision, the UE 110 reports measurement values only for those cells that fulfill the wishes of the UE 110. FIG. 4 illustrates that, in step 400, the UE 110 sends a measurement report only about at least one cell, for example, the neighboring cell Z that is described above.

In certain embodiments, a network identifies candidate cells for supporting service continuity for a UE PDU session, based on (a) current cell ID, (b) slice ID, (c) available cells supporting slice in vicinity of the UE 110, and (d) their load (capability to serve the UE 110 if needed).

In certain embodiments, a network communicates the cell IDs to a UE 110, both at PDU session establishment and at handover, and optionally, when there is change of status of cells in a list (e.g., change of available resources of cells).

In certain embodiments, a UE 110 reports measurement values for only the identified slice cells (if possible, if there are no/not enough slice cells heard by the UE 110 it may report also other cells measurements) to the network, based on measurements network tells the UE 110 to make handover (according to relevant standard)—when only reporting measurements of supporting cells network can only tell the UE 110 to move to those cells.

In certain embodiments, a UE 110 measures signals for all cells the UE 110 can hear and then reports resulting measurement results to the network; the network, based on (at least) the measurement results, decides when to make a handover and to which cell. The UE 110 might still do measurements for all cells the UE 110 can hear (or then just those cells whose ID is in the cell ID list), but the UE 110 selectively reports back measurement results to the network of cells on the list so the network can only make handover to cells that the UE 110 "likes" to use. Assuming there are enough cell IDs on the list that the UE 110 can get good measurements from the UE 110 may avoid reporting measurements for other cell IDs. For the case with multiple slices in use, the UE 110 might be that there are a few or perhaps just one additional cell supporting all slices and then maybe the UE 110 will report measurements also for some less optimal cells—if e.g., a UE 110 always has to report measurements for a minimum number of cells it might have to report measurements also for less than optimal cells. In this case, it may edit the measurement values of the less than optimal cells so that the network would not choose them over the optimal cells. The UE 110 can report measurements also for less than optimal cells (cell not supporting any or some of the slices) but it can modify the measurement values for those to make the network prefer the cells that satisfy a selection criteria from the UE's point of view.

FIG. 5 shows a flow diagram for steps performed by the UE 110 in accordance with some embodiments.

In step 500, optionally, the UE 110 sends, to the network node 108, a second message that requests establishment of a session over the particular network slice. For example, the network node 108 is the AMF 108. For example, the second message is the 'PDU session establishment request' message, which is illustrated in FIG. 2 and the above relevant paragraphs.

In step 502, the UE 110 receives, from the network node 108 on a first cell, a first message comprising an identification of at least one cell that supports the particular network slice. For example, the first message is the 'PDU session establishment accept' message, which is illustrated in FIG. 2 and the above relevant paragraphs. For example, the first message is in response to the second message. For example, the first message is the 'PDU session establishment accept' message and the second message is the 'PDU session establishment request' message.

In step 504, optionally, the UE 110 is engaged in a handover operation based on the indication comprised in the received first message. For example, the UE 110 performs the handover operation (step 504A) or initiates the handover operation by sending a handover request to a target cell corresponding to the at least one cell (step 504B).

FIG. 6 shows a flow diagram for steps performed by the network node 108 (e.g., the AMF 108) in accordance with some embodiments.

In step 600, optionally, the network node 108 receives, from the UE 110, the second message.

In step 602, optionally, the network node 108 determines at least one cell that supports the particular network slices. The details of this step are shown in the step 204 of FIG. 2 and the step 300 of FIG. 3 and the above relevant paragraphs.

In step 604, the network node 108 sends, to the UE 110, the first message.

FIG. 7 shows a communication device 700 in the form of the UE 110 in accordance with some embodiments. As used herein, the UE 110 refers to a device capable, configured, arranged and/or operable to communicate wirelessly with network nodes 108 and/or other UEs. Examples of the UE 110 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

The UE 110 may support device-to-device (D2D) communication, for example by implementing a 3GPP standard for sidelink communication, Dedicated Short-Range Communication (DSRC), vehicle-to-vehicle (V2V), vehicle-to-infrastructure (V2I), vehicle-to-everything (V2X) and may in this case be referred to as a D2D communication device. In other examples, a UE 110 may not necessarily have a user in the sense of a human user who owns and/or operates the relevant device. Instead, a UE 110 may represent a device that is intended for sale to, or operation by, a human user but which may not, or which may not initially, be associated with a specific human user (e.g., a smart sprinkler controller). Alternatively, a UE 110 may represent a device that is not intended for sale to, or operation by, an end user but which may be associated with or operated for the benefit of a user (e.g., a smart power meter).

In FIG. 7, the UE 700 (which may correspond to the UE 110 in FIG. 1) includes processing circuitry 702 that is operatively coupled to an input/output interface 704, a network connection interface 706, a power source 708, a memory 710 including random access memory (RAM), read-only memory (ROM), or the like, communication subsystem 712, and/or any other component, or any combination thereof. The memory 710 may include a computer program, for example in the form of one or more application programs 714 and data 716. In other embodiments, the memory 710 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, the processing circuitry 702 is configured to process instructions and data. The processing circuitry 702 may be configured to implement any sequential state machine operative to execute instructions stored as machine-readable computer programs in the memory 710, such as one or more hardware-implemented state machines (e.g., in discrete logic, field-programmable gate arrays (FPGAs), application specific integrated circuits (ASICs), etc.); programmable logic together with appropriate firmware; one or more stored program, general-purpose processors, such as a microprocessor or digital signal processor (DSP), together with appropriate software; or any combination of the above. For example, the processing circuitry 702 may include multiple central processing units (CPUs). Data may be information in a form suitable for use by a computer.

In certain embodiments, some or all of the functionality described herein as being performed by a UE may be provided by the processing circuitry 702 executing instructions stored on the memory 710, which in certain embodiments may be a computer program product in the form of a computer-readable storage medium. In alternative embodiments, some or all of the functionalities may be provided by the processing circuitry 702 without executing instructions stored on a separate or discrete device readable storage medium, such as in a hard-wired manner. In any of those particular embodiments, whether executing instructions stored on a device readable storage medium or not, the processing circuitry 702 can be configured to perform the described functionality. The benefits provided by such functionality are not limited to the processing circuitry 702 alone or to other components of the UE 700, but are enjoyed by the UE 700 as a whole, and/or by end users and the wireless network generally.

In the present example, the input/output interface 704 may be configured to provide a communication interface to an input device, output device, or input and output device. The UE 700 may be configured to use an output device via the input/output interface 704. An output device may use the same type of interface port as an input device. For example, a Universal Serial Bus (USB) port may be used to provide input to and output from the UE 700. The output device may be a speaker, a sound card, a video card, a display, a monitor, a printer, an actuator, an emitter, a smartcard, another output device, or any combination thereof. The UE 700 may be configured to use an input device via the input/output interface 704 to allow a user to capture information into the UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof.

The network connection interface 706 may be configured to provide a communication interface. The network connection interface 706 may implement receiver and transmitter functionality appropriate to the communication network links (e.g., optical, electrical, and the like). The transmitter and receiver functions may share circuit components, software or firmware, or alternatively may be implemented separately. The network connection interface 706 may be configured to include an antenna, a receiver, and a transmitter interface used to communicate with one or more other devices over a communication network according to one or more communication protocols, such as Ethernet, transmission control protocol/internet protocol (TCP/IP), synchronous optical networking (SONET), Asynchronous Transfer Mode (ATM), QUIC, Hypertext Transfer Protocol (HTTP) and the like.

The power source 708 may, in some embodiments, be in the form of a battery or battery pack. Other types of power sources, such as an external power source (e.g., an electricity outlet), photovoltaic devices or power cells, may also be used. The power source 708 may further include power circuitry for delivering power from the power source 708 to the various parts of UE 700 that use power from the power source 708 to carry out any functionality described or indicated herein. Power circuitry may in certain embodiments include power management circuitry. Power circuitry may additionally or alternatively be operable to receive power from an external power source; in which case the UE 700 may be connectable to the external power source (such as an electricity outlet) via input circuitry or an interface such as an electrical power cable. Power circuitry may also in certain embodiments be operable to deliver power from an external power source to the power source 708. This may be, for example, for the charging of the power source 708. Power circuitry may perform any formatting, converting, or other modification to the power from the power source 708 to make the power suitable for the respective components of the UE 700 to which power is supplied.

The memory 710 may be configured to include memory such as, programmable read-only memory (PROM), erasable programmable read-only memory (EPROM), electrically erasable programmable read-only memory (EEPROM), magnetic disks, optical disks, hard disks, removable cartridges, or flash drives. In one example, where the memory 710 includes one or more application programs 714, such as an operating system, web browser application, a widget, gadget engine, or other application, and corresponding data 216. The memory 710 may store, for use by the UE 700, any of a variety of various operating systems or combinations of operating systems.

The memory 710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a universal SIM (USIM) and/or integrated SIM (ISIM), other memory, or any combination thereof. The UICC may for example be an embedded UICC (eUICC), integrated UICC (iUICC) or a removable UICC commonly known as 'SIM card.' The memory 710 may allow the UE 700 to access instructions, application programs or the like, stored on transitory or non-transitory memory media, to off-load data, or to upload data. An article of manufacture, such as one utilizing a communication system may be tangibly embodied in the memory 710, which may comprise a device readable medium.

The processing circuitry 702 may be configured to communicate with an access network using the communication subsystem 712. The communication subsystem 712 may be configured to include one or more transceivers used to communicate with an access network. For example, the communication subsystem 712 may be configured to include one or more transceivers used to communicate with one or more remote transceivers of another device capable of wireless communication such as another UE or network node of an access network. Each transceiver may include a transmitter 718 and/or a receiver 720 to implement transmitter or receiver functionality, respectively, appropriate to access network communications (e.g., frequency allocations and the like). Further, transmitter 718 and receiver 720 of each transceiver may share circuit components, software or firmware, or alternatively may be implemented separately.

In the illustrated embodiment, the communication functions of the communication subsystem 712 may include cellular communication, Wi-Fi communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, and so forth.

The features, benefits and/or functions described herein may be implemented in one of the components or partitioned across multiple components of the UE 700. Further, the features, benefits, and/or functions described herein may be implemented in any combination of hardware, software or firmware. In one example, the communication subsystem 712 may be configured to include any of the components described herein. Further, the processing circuitry 702 may be configured to communicate with any of such components over the bus 703. In another example, any of such components may be represented by instructions stored in memory that when executed by the processing circuitry 702 perform the corresponding functions described herein. In another example, the functionality of any of such components may be partitioned between the processing circuitry 702 and the communication subsystem 712. In another example, the non-computationally intensive functions of any of such components may be implemented in software or firmware and the computationally intensive functions may be implemented in hardware.

In an example scenario, the UEs 110*a*, 110*b*, 110*c*, and 110*d* might, in one example, form part of an environmental or home/building monitoring system for monitoring one or more ambient conditions, and could for example comprise a sensor for detecting temperature, infrared (IR) levels, water levels, air toxicity levels etc. These conditions may be monitored for the purpose of detecting natural events, e.g. earthquakes, fires, floods etc.; for detecting the failure of household/building equipment or for automating building controls such as light and/or ambient temperature levels. Data captured by a UE and/or remote device may be provided via wireless connection to the network node 108*b* for communication to a control center or personal device.

Regardless of the type of sensor, a UE 110 may provide an output of data captured by its sensors, through its network interface, via a wireless connection to a network node 108. Data captured by sensors of a UE can be communicated through wireless connection to the network node 108*b* via the hub 114. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a network interface configured to receive wireless input from the network node 108*b* via a wireless connection. In response to the received wireless input the states of the actuator, a motor, or a switch may change. For example, the UE may comprise a motor that adjusts the control surfaces or rotors of a drone in flight according to the received input or to a robotic arm performing a medical procedure according to the received input.

A communication device such as a UE 110*a*, 110*b*, 110*c*, or 110*d*, when in the form of an IoT device, may be a device for use in one or more application domains, these domains comprising, but not limited to, home, city, wearable technology, extended reality, agriculture, industrial application and healthcare. A UE in the form of an IoT device comprises circuitry and/or software in dependence of the intended application of the IoT device in addition to a network interface, processing circuitry, power source and other components as described below in relation to the UE 700 shown in FIG. 7.

As yet another specific example, in an Internet of Things (IoT) scenario, a UE 110 may represent a machine or other device that performs monitoring and/or measurements, and transmits the results of such monitoring and/or measurements to another UE and/or a network node 108. The UE may in this case be an M2M device, which may in a 3GPP context be referred to as an MTC device. As one particular example, the UE may implement the 3GPP NB-IoT standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

By way of example, a communication device in the form of the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter or a gas meter.

As further ways of example, the IoT device for use in a city, urban or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera or other connected device on a public transport vehicle.

As further way of example, the IoT device may be a wearable device, or a device related to extended reality, wherein the device related to extended reality may be a device related to augmented reality, virtual reality, merged reality or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter or a pressure meter.

As further ways of example, the IoT device may be an industrial application device wherein an industrial application device may be an industrial unmanned aerial vehicle, an intelligent industrial robot, a vehicle assembly robot or an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter or a hovercraft.

As further ways of example, the IoT device may be a health or fitness device, wherein a health or fitness device may be a surgical robot, an implantable medical device, a non-invasive medical device, or a stationary medical device which may be: an in-vitro diagnostic device, a radiology device, a diagnostic imaging device or an x-ray device.

A vehicle as described herein could be autonomous, remote-controlled or controlled by a driver. A robot as described herein typically comprises one or more sensors and/or actuators to provide to the robot the capability to change its location whether autonomously or at the direction of a user, i.e., through remote control. A remote-controlled apparatus, such as a vehicle or a robot, may receive instructions on movement, actuating or sensing from a user via a wireless connection and provide location, sensor or video information back to the user via wireless connection. An autonomous vehicle or robot may receive alerts and other messages from other vehicles, robots and/or infrastructure sensors via a wireless connection as well as provide its own telemetry data to others via the wireless connection. An autonomous vehicle or robot may comprise one or more sensors for mapping an environment or terrain. The sensors might include one or more of: a range sensor, imaging device, motion sensor, or barometric sensor. The autonomous vehicle or robot might include a positioning system for calculating its position, with the position data being communicated to a network node 108 via wireless connection, which may in turn provide the data to a host, such as an original equipment manufacturer (OEM) server.

A remote controller as described herein may be a device dedicated to controlling other communication devices or a computer with a program or application that provides control of other communication devices. For example, the remote controller may receive a video signal via a wireless connection from a remote surgical room, and then issue commands via the wireless connection to a remote surgical machine that can execute the commands.

In practice any number of UEs may be used together with respect to a single use case. For example, a UE might be integrated in a drone and provide the drone's speed information (obtained through a speed sensor) to a communication device that is a remote controller operating the drone. When the user makes changes from the remote controller, the UE may adjust the throttle on the drone (e.g., by controlling an actuator) to increase or decrease the drone's speed. The UE can also include more than one of the functionalities described above. For example, a UE might comprise the sensor and the actuator, and handle communication of data for both the speed sensor and the actuators.

FIG. 8 shows the network node 108 in accordance with some embodiments.

As used herein, the network node 108 refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes 108 include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node 108 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes 108 include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and User Plane Function (UPF)), Operation and Maintenance (O&M) nodes, Operations Support System (OSS) nodes, Self-Organizing Network (SON) nodes, positioning nodes (e.g., evolved Serving Mobile Location Centers (E-SMLCs)), and/or Minimization of Drive Tests (MDTs). As another example, a network node may be a virtual network node as described in more detail below.

In FIG. 8, the network node 800 (which may correspond to the network node 108 in FIG. 1) includes a processing circuitry 802, a memory 804, an interface 806, a power source 808, and an antenna 810. Although the network node 800 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of the network node 800 are depicted as single boxes located within a larger box, or nested within multiple boxes, in practice, a network node may comprise multiple different physical components that make up a single illustrated component (e.g., the memory 804 may comprise multiple separate hard drives as well as multiple RAM modules).

Similarly, the network node 800 may be composed of multiple physically separate components (e.g., a NodeB component and a RNC component, or a BTS component and a BSC component, etc.), which may each have their own respective components. In certain scenarios in which network node 800 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 800 may be configured to support multiple radio access technologies (RATs). In such embodiments, some components may be duplicated (e.g., separate memory 804 for the different RATs) and some components may be reused (e.g., the same antenna 810 may be shared by the RATs). The network node 800 may also include multiple sets of the various illustrated components for different wireless technologies integrated into network node 800, such as, for example, GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 800.

The processing circuitry 802 is configured to perform any determining, calculating, or similar operations (e.g., certain obtaining operations) described herein as being provided by a network node. These operations performed by the processing circuitry 802 may include processing information obtained by the processing circuitry 802 by, for example, converting the obtained information into other information, comparing the obtained information or converted information to information stored in the network node, and/or performing one or more operations based on the obtained information or converted information, and as a result of said processing making a determination.

The processing circuitry 802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 800 components, such as the memory 804, to provide network node 800 functionality.

In some embodiments, processing circuitry 802 may include a system on a chip (SOC). In some embodiments, the processing circuitry 802 may include one or more of radio frequency (RF) transceiver circuitry 812 and baseband processing circuitry 814. In some embodiments, RF transceiver circuitry 812 and baseband processing circuitry 814 may be on separate chips (or sets of chips), boards, or units, such as radio units and digital units. In alternative embodiments, part or all of RF transceiver circuitry 812 and baseband processing circuitry 814 may be on the same chip or set of chips, boards, or units.

Memory 804 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 802. The memory 804 may store any suitable instructions, data or information, including a computer program, software, an application including one or more of logic, rules, code, tables, etc. and/or other instructions capable of being executed by processing circuitry 802 and, utilized by network node 800. The memory 804 may be used to store any calculations made by the processing circuitry 802 and/or any data received via the interface 806. In some embodiments, the processing circuitry 802 and memory 804 may be considered to be integrated.

In certain embodiments, some or all of the functionality described herein as being provided by a network node may be performed by the processing circuitry 802 executing instructions stored on the memory 804 or memory within the processing circuitry 802. In alternative embodiments, some or all of the functionalities may be provided by the processing circuitry 802 without executing instructions stored on a separate or discrete device readable medium, such as in a hard-wired manner. In any of those embodiments, whether executing instructions stored on a device readable storage medium or not, the processing circuitry 802 can be configured to perform the described functionality. The benefits provided by such functionality are not limited to the processing circuitry 802 alone or to other components of the network node 800, but are enjoyed by the network node 800 as a whole, and/or by end users and the wireless network generally. Such functionality may include providing any of the various wireless features, functions, or benefits discussed herein.

The interface 806 is used in the wired or wireless communication of signaling and/or data between a network node, access network, and/or UE. As illustrated, the interface 806 comprises port(s)/terminal(s) 816 to send and receive data, for example to and from the network 106 over a wired connection. The interface 806 also includes radio front end circuitry 818 that may be coupled to, or in certain embodiments a part of, the antenna 810. Radio front end circuitry 818 comprises filters 820 and amplifiers 822. Radio front end circuitry 818 may be connected to antenna 810 and processing circuitry 802. Radio front end circuitry may be configured to condition signals communicated between antenna 810 and processing circuitry 802. Radio front end circuitry 818 may receive digital data that is to be sent out to other network nodes or UEs via a wireless connection. Radio front end circuitry 818 may convert the digital data into a radio signal having the appropriate channel and bandwidth parameters using a combination of filters 820 and/or amplifiers 822. The radio signal may then be transmitted via the antenna 810. Similarly, when receiving data, the antenna 810 may collect radio signals which are then converted into digital data by radio front end circuitry 818. The digital data may be passed to the processing circuitry

802. In other embodiments, the interface may comprise different components and/or different combinations of components.

In certain alternative embodiments, the network node 800 may not include separate radio front end circuitry 818, instead, the processing circuitry 802 may comprise radio front end circuitry and may be connected to the antenna 810 without separate radio front end circuitry 818. Similarly, in some embodiments, all or some of RF transceiver circuitry 812 may be considered a part of the interface 806. In still other embodiments, the interface 806 may include one or more ports or terminals 816, radio front end circuitry 818, and RF transceiver circuitry 812, as part of a radio unit (not shown), and the interface 806 may communicate with baseband processing circuitry 814, which is part of a digital unit (not shown).

The antenna 810 may include one or more antennas, or antenna arrays, configured to send and/or receive wireless signals. The antenna 810 may be coupled to radio front end circuitry 818 and may be any type of antenna capable of transmitting and receiving data and/or signals wirelessly. In some embodiments, the antenna 810 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as multiple-input and multiple-output (MIMO). In certain embodiments, the antenna 810 may be separate from the network node 800 and may be connectable to the network node 800 through an interface or port.

The antenna 810, interface 806, and/or processing circuitry 802 may be configured to perform any receiving operations and/or certain obtaining operations described herein as being performed by the network node. Any information, data and/or signals may be received from a wireless device, another network node and/or any other network equipment. Similarly, the antenna 810, interface 806, and/or processing circuitry 802 may be configured to perform any transmitting operations described herein as being performed by the network node. Any information, data and/or signals may be transmitted to a wireless device, another network node and/or any other network equipment.

The power source 808 is configured to provide power to the various components of network node 800 in a form suitable for the respective components (e.g., at a voltage and current level needed for each respective component). The power source 808 may further comprise, or be coupled to, power management circuitry to supply the components of the network node 800 with power for performing the functionality described herein. For example, the network node 800 may be connectable to an external power source (e.g., the power grid, an electricity outlet) via an input circuitry or interface such as an electrical cable, whereby the external power source supplies power to power circuitry of the power source 808. As a further example, the power source 808 may comprise a source of power in the form of a battery or battery pack which is connected to, or integrated in, power circuitry. The battery may provide backup power should the external power source fail. Other types of power sources, such as photovoltaic devices, may also be used.

Alternative embodiments of the network node 800 may include additional components beyond those shown in FIG. 8 that may be responsible for providing certain aspects of the network node's functionality, including any of the functionality described herein and/or any functionality necessary to support the subject matter described herein. For example, the network node 800 may include user interface equipment to allow input of information into the network node 800 and to allow output of information from the network node 800. This may allow a user to perform diagnostic, maintenance, repair, and other administrative functions for the network node 800.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| AF | Application Function |
| AMF | Access and Mobility Management Function |
| AN | Access Network |
| AP | Access Point |
| AR | Augmented Reality |
| ASIC | Application Specific Integrated Circuit |
| ATM | Asynchronous Transfer Mode |
| AUSF | Authentication Server Function |
| BSC | Base Station Controllers |
| BTS | Base Transceiver Station |
| CD | Compact Disk |
| CPE | Customer-Premise Equipment |
| CPU | Central Processing Unit |
| D2D | Device-to-Device |
| DDoS | Distributed Denial-of-Service |
| DN | Data Network |
| DSP | Digital Signal Processor |
| DSRC | Dedicated Short-Range Communication |
| DVD | Digital Video Disk |
| EEPROM | Electrically Erasable Programmable Read Only Memory |
| eMBB | Enhanced Mobile Broadband |
| eNB | Enhanced or Evolved Node B |
| EN-DC | E-UTRAN New Radio - Dual Connectivity |
| EPS | Evolved Packet System |
| EPROM | Erasable Programmable Read Only Memory |
| E-UTRA | Evolved Universal Terrestrial Radio Access |
| FPGA | Field Programmable Gate Array |
| gNB | New Radio Base Station |
| gNB-DU | New Radio Base Station Distributed Unit |
| GSM | Global System for Mobile Communications |
| HSS | Home Subscriber Server |
| HTTP | Hypertext Transfer Protocol |
| ID | Identifier |
| IEEE | Institute of Electrical and Electronics Engineers |
| IoE | Internet of Everything |
| IoT | Internet of Things |
| IP | Internet Protocol |
| LEE | Laptop-Embedded Equipment |
| LME | Laptop-Mounted Equipment |
| LTE | Long Term Evolution |
| M2M | Machine-2-Machine |
| MIMO | Multiple-Input and Multiple-Output |
| MME | Mobility Management Entity |
| mMTC | Massive Machine Type Communication |
| MR-DC | Multi-Radio Dual Connectivity |
| MTC | Machine Type Communication |
| NAS | Non-Access Stratum |
| NB-IoT | Narrow Band Internet of Things |
| NEF | Network Exposure Function |
| NF | Network Function |
| NPN | Non-Public Network |
| NR | New Radio |
| NRF | Network Function Repository Function |
| NSSF | Network Slice Selection Function |
| OTT | Over-the-Top |
| PC | Personal Computer |
| PCF | Policy Control Function |

-continued

| | |
|---|---|
| PDA | Personal Digital Assistant |
| PDU | Protocol Data Unit |
| P-GW | Packet Data Network Gateway |
| PROM | Programmable Read Only Memory |
| QoS | Quality of Service |
| RAM | Random Access Memory |
| RAN | Radio Access Network |
| RAT | Radio Access Technology |
| RF | Radio Frequency |
| RFID | Radio Frequency Identification |
| RNC | Radio Network Controller |
| ROM | Read Only Memory |
| RRH | Remote Radio Head |
| RTT | Round Trip Time |
| SCEF | Service Capability Exposure Function |
| SIMs | Subscriber Identity Modules |
| SMF | Session Management Function |
| S-NSSAI | Single-Network Slice Selection Assistance Information |
| UDM | Unified Data Management |
| UE | User Equipment |
| UICC | Universal Integrated Circuit Card |
| UMTS | Universal Mobile Telecommunications System |
| UPF | User Plane Function |
| URLLC | Ultra Reliable Low Latency Communication |
| USB | Universal Serial Bus |
| V2V | Vehicle-to-Vehicle |
| V2X | Vehicle-to-Everything |
| VoIP | Voice Over Internet Protocol |
| VPN | Virtual Private Network |
| VR | Virtual Reality |
| WCDMA | Wideband Code Division Multiple Access |
| WiMax | Worldwide Interoperability for Microwave Access |
| WLAN | Wireless Local Area Network |

Those skilled in the art will recognize improvements and modifications to the embodiments of the present disclosure. All such improvements and modifications are considered within the scope of the concepts disclosed herein.

The invention claimed is:

1. A method performed by a User Equipment (UE) comprising:

sending, to a network node on a first cell, a measurement report only about at least one cell other than the first cell that supports a particular network slice, wherein the particular network slice is in use by the UE on the first cell;

receiving, from the network node, a first message comprising an indication of the at least one cell; and engaging in a handover operation based on the indication comprised in the received first message.

2. The method of claim 1, wherein engaging in the handover operation comprises performing the handover operation.

3. The method of claim 1, wherein engaging in the handover operation comprises initiating the handover operation by sending a handover request to a target cell from among the at least one cell.

4. The method of claim 1, wherein the first message is a Protocol Data Unit (PDU) session establishment accept message.

5. The method of claim 1 wherein the first message comprises a Protocol Data Unit (PDU) modification command comprising the indication of that at least one cell that supports the particular network slice.

6. The method of claim 1 further comprising:

sending, to the network node, a second message that requests establishment of a session over the particular network slice, wherein receiving the first message comprises receiving the first message in response to the sending second message.

7. The method of claim 6 wherein the second message is a Protocol Data Unit (PDU) session establishment request, and the first message is a PDU session establishment accept message.

8. The method of claim 1, wherein the particular network slice is identified by a Single-Network Slice Selection Assistance Information (S-NSSAI) and is a network slice that is selected by the UE.

9. The method of claim 1, wherein the particular network slice is identified by a Single-Network Slice Selection Assistance Information (S-NSSAI) and is a network slice that is selected by the network node.

10. The method of claim 1, wherein measurement values in the measurement report are modified by the UE to influence a preference of the at least one cell by the network node.

11. A method performed by a network node, comprising:

receiving, from a User Equipment (UE) on a first cell, a measurement report only about at least one cell other than the first cell that supports a particular network slice, wherein the particular network slice is in use by the UE on the first cell; and sending, to the UE, a first message comprising an identification of the at least one cell.

12. The method of claim 11 further comprising determining the at least one cell that supports the particular network slice based on one or more of factors related to the UE or one or more cells, wherein the factors comprise load associated with cells that support the particular network slice.

13. The method of claim 12 wherein the factors comprise one or more of: (a) a cell identifier (ID) associated with the UE, (b) a Single-Network Slice Selection Assistance Information (S-NSSAI) of the particular network slice, (c) cells that support the particular network slice.

14. The method of claim 11 wherein the first message comprises a Protocol Data Unit (PDU) modification command comprising the indication of that at least one cell that supports the particular network slice.

15. The method of claim 11 further comprising:

receiving, from the UE, a second message that requests establishment of a session over the particular network slice, wherein sending the first message to the UE comprises sending the first message to the UE in response to the receiving the second message.

16. The method of claim 15 wherein the second message is a Protocol Data Unit (PDU) session establishment request, and the first message is a PDU session establishment accept message.

17. The method of claim 11, wherein measurement values in the measurement report are modified by the UE to influence a preference of the at least one cell by the network node.

18. A User Equipment (UE) comprising:

one or more transmitters;

one or more receivers; and processing circuitry associated with the one or more transmitters and the one or more receivers, the processing circuitry configured to cause the UE to perform operations comprising:

sending, to a network node on a first cell, a measurement report only about at least one cell other than the first cell that supports a particular network slice, wherein the particular network slice is in use by the UE on the first cell;

receive, from the network node, a first message comprising an indication of the at least one cell; and engage in a handover operation based on the indication comprised in the received first message.

19. The UE of claim 18, wherein engaging in the handover operation comprises performing the handover operation.

20. The UE of claim 18, wherein engaging in the handover operation comprises initiating the handover operation by sending a handover request to a target cell from among the at least one cell.

21. The UE of claim 18, wherein the first message is a Protocol Data Unit (PDU) session establishment accept message.

22. The UE of claim 18 wherein the first message comprises a Protocol Data Unit (PDU) modification command comprising the indication of that at least one cell that supports the particular network slice.

23. The UE of claim 18, wherein the operations further comprise:

sending, to the network node, a second message that requests establishment of a session over the particular network slice, wherein receiving the first message comprises receiving the first message in response to the sending second message.

24. A network node comprising processing circuitry configured to cause the network node to perform operations, comprising:

receiving, from a User Equipment (UE) on a first cell, a measurement report only about at least one cell other than the first cell that supports a particular network slice, wherein the particular network slice is in use by the UE on the first cell; and sending, to the UE, a first message comprising an identification of the at least one cell.

25. The network node of claim 24 further comprising determining the at least one cell that supports the particular network slice based on one or more of factors related to the UE or one or more cells, wherein the factors comprise load associated with cells that support the particular network slice.

26. The network node of claim 25 wherein the factors further comprise one or more of: (a) a cell identifier (ID) associated with the UE, (b) a Single-Network Slice Selection Assistance Information (S-NSSAI) of the particular network slice, or (c) the cells that support the particular network slice.

* * * * *